May 17, 1949.     T. C. CAMPBELL ET AL     2,470,602
TANDEM WING AIRCRAFT

Filed Oct. 16, 1945     3 Sheets-Sheet 1

INVENTORS
THOMAS COCHRANE CAMPBELL
ERIC VINCENT HALL
BY
THEIR ATTY

May 17, 1949. T. C. CAMPBELL ET AL 2,470,602
TANDEM WING AIRCRAFT
Filed Oct. 16, 1945 3 Sheets-Sheet 2
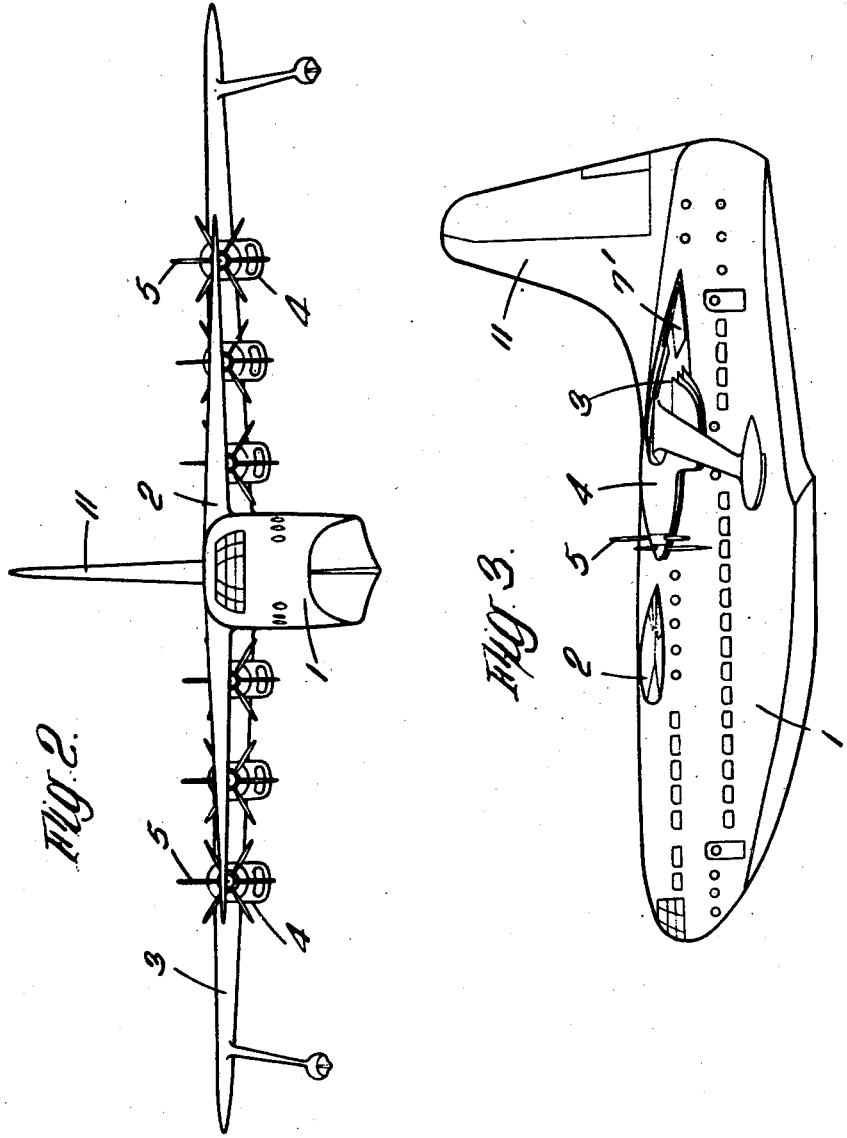
INVENTORS
THOMAS COCHRANE CAMPBELL
ERIC VINCENT HALL
BY Otto Munk
THEIR ATTY

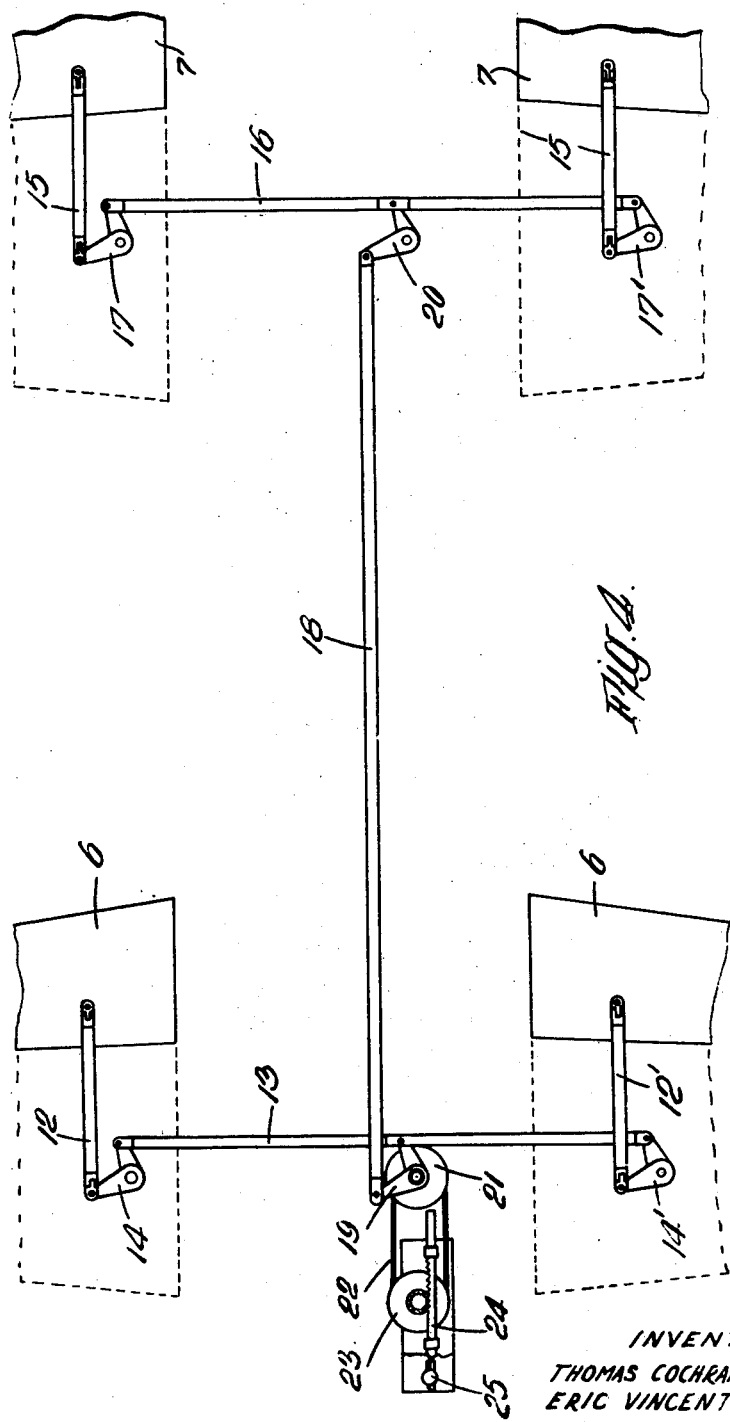

Patented May 17, 1949

2,470,602

UNITED STATES PATENT OFFICE 2,470,602

TANDEM WING AIRCRAFT

Thomas Cochrane Campbell, Hessle, and Eric Vincent Hall, Hull, England, assignors to Blackburn Aircraft Limited, Brough, England Application October 16, 1945, Serial No. 622,624
In Great Britain December 6, 1944

11 Claims. (Cl. 244—45)

This invention relates to improvements in aircraft and has for its object to provide a novel design of multi-engined aircraft having improved aerodynamic performance which is such that when embodied in a flying boat also gives a higher degree of seaworthiness.

Attempts have been made in the past to design a tail first aeroplane or, more accurately, a tandem wing aircraft in which the leading wing is small compared to the main rear wing. As applied to single engined and low-powered multiengine aircraft, this proposal has achieved some measure of success but with multi-engine highpowered aircraft adverse aerodynamic characteristics come into play due to the slipstream effect of the powerful engines on the main wing at take-off and landing, which involve the provision of extremely high additional lift on the forward wing. Such a high degree of additional lift cannot successfully be obtained merely by means of flaps on the leading wing and the addition of other devices, e. g. slots for such would give dangerous flying qualities.

More particularly the object of the present invention is to provide novel safe means of obtaining high lift on the leading wing of such multiengine tandem wing aircraft to balance the extra lift induced by slipstream effect on the main wing, which comes about automatically when required. To this end, according to the invention, flaps provided on the leading wing and on the trailing main wing are interconnected for simultaneous actuation, the propellers are located intermediate the wings and preferably closer to the trailing edge of the leading wing than to the leading edge of the trailing wing so as to induce an equal slipstream effect on both wings, and the span of the flaps on the main wing traversed by the slipstream is not less than the span of the flaps on the leading wing or the length thereof over which slipstream effect is induced. In this way the lift induced on the leading smaller wing balances the lift induced on the main trailing wing about the centre of gravity of the aircraft.

The invention is applicable to tandem wing aircraft having two, four or more high horse-power engines symmetrically disposed on a main wing with a span sufficient to provide adequate ailerons lying outside the slipstream area. Fixed leading edge slots may be provided on the main wing outboard of the engines.

In order that the invention may be clearly understood and readily applied an embodiment as applied to a flying boat is hereinafter more fully described with reference to the accompanying drawings, which are given solely for the purpose of illustration and in which Figure 1 is a plan view looking down on a flying boat;

Figure 2 is a front elevation thereof;

Figure 3 is a side elevation, and

Figure 1:
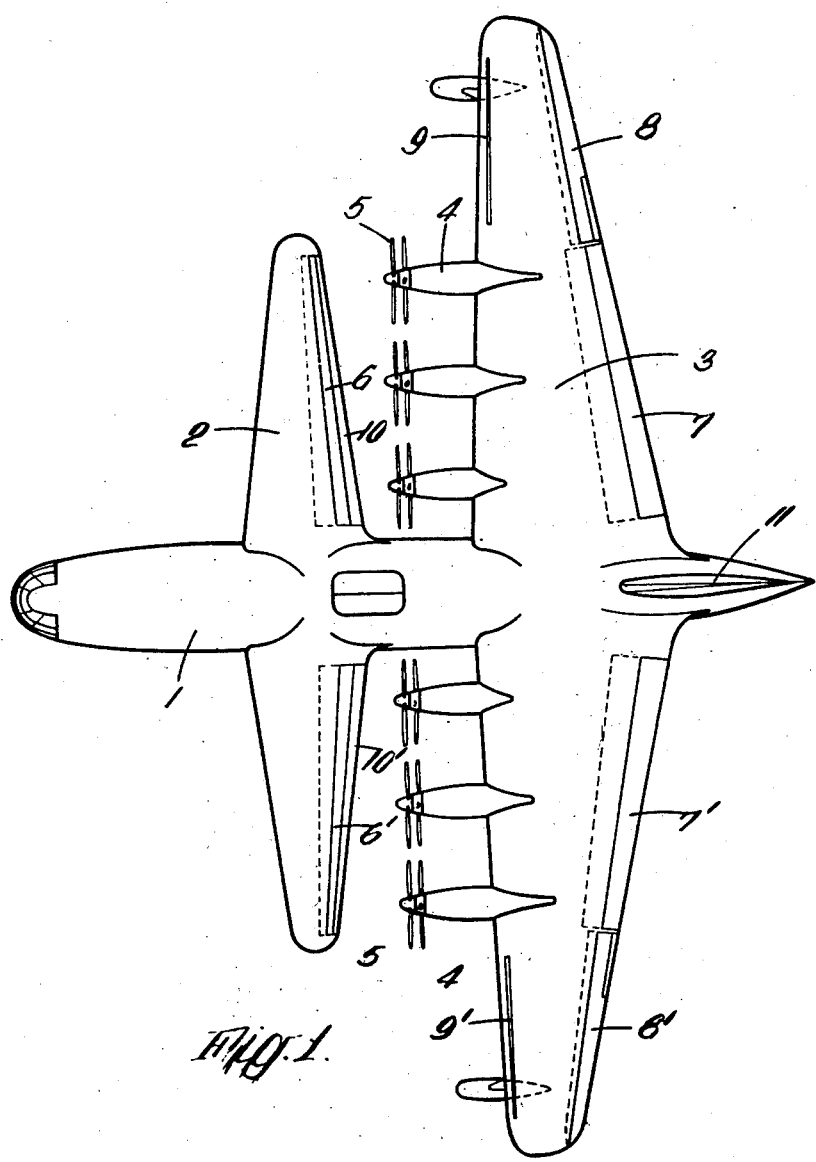

Figure 4 indicates diagrammatically one way of interconnecting the flaps on the leading and trailing wings for simultaneous actuation.

Referring now to the said drawings, a flying boat hull 1 is provided with a leading wing 2 of smaller area towards the front thereof and at the rear with a main wing 3. The main wing 3 carries symmetrically thereon an even number of high horse-power engines in nacelles 4 with their propellers 5 situated at such position intermediate the leading wing 2 and main wing 3 as to induce slipstream effect over both wings. The leading wing 2 is provided with flaps 6, $6^1$ and the main wing 3 is provided with flaps 7, $7^1$ and the flaps of the respective wings are interconnected for simultaneous actuation as indicated in Figure 4 where the flaps 6 are actuated by members 12, $12^1$ both moved equal extents in the same direction by a common cross member 13 through double arm levers 14, $14^1$ respectively, and the flaps 7 on the trailing main wing 3 are similarly actuated by members 15, $15^1$ under control of a cross member 16 through double arm levers 17, $17^1$ respectively. The cross members 13, 16 are simultaneously actuated by a common control member 18, which is connected to the cross control members 13, 16 by double arm levers 19, 20 respectively. The one double arm lever, for example that numbered 19 is rocked by means, for example of a pulley 21 rotated by an endless band 22 from a pulley 23 which is rotated by a rack and pinion 24, of which the rack is displaceable on moving the operating control 25.

The span of the flaps 7, $7^1$ may be equal to, or greater than the span of the flaps 6, $6^1$ on the leading wing 2 substantially as illustrated. It is, however, essential that the spans of the flaps 7, $7^1$ traversed by the slipstream effect induced by the propellers 5 shall not be less than the span of the flaps 6, $6^1$ over which slipstream effect is induced. The span of the main wing 3 is sufficient to provide ailerons 8, $8^1$ beyond the slipstream area and, if desired in this portion of the wing, fixed slots 9, $9^1$ may be provided at the leading edge. Elevators 10, $10^1$ are provided on the leading wing 2 and are conveniently hinged to the trailing edge of the flaps 6, $6^1$ of that wing.

The fin and rudder 11 may be closely situated to the wing root substantially as illustrated or carried by a rearward extension at the upper part of the rear end of the hull. The aircraft centre of gravity is situated at some point intermediate the wings as is customary for this type of aircraft.

The disposition of the propellers and the interconnection of the flaps on the leading and trailing wings maintains a balance of lift forces about the centre of gravity of the aircraft for any flap setting and for any degree of throttle opening. This condition is obtained by reason of the fact that the moment about the centre of gravity of the aircraft of the lift induced on the trailing wing by the slipstream is balanced by the equal and opposite moment about the centre of gravity of the aircraft of the lift induced on the leading wing by the slipstream. This balancing of the lift characteristics avoids down thrust at the nose of the aircraft which, at best, is a nuisance in land planes and might be disastrous in flying boats and seaplanes. The application of the present invention to a flying boat ensures that the elevators, which are on the leading wing, are well clear of the wash thrown up by the hull and greatly increases the ability of the aircraft to take off in a heavy sea.

We claim:

1. An aircraft comprising a main wing and a smaller leading wing and a plurality of tractor propellers disposed intermediate said wings, said propellers having their axes in the same plane as said leading wing and being disposed sufficiently close to the trailing edge of said leading wing as to induce a slipstream effect of airflow past said leading wing to increase the lift thereof, said propellers being so spaced between said wings as to induce substantially equal changes in lift per unit area due to slipstream effect on both wings so as to maintain said aircraft in balance about the center of gravity for power-off and power-on conditions.

2. An aircraft comprising a main wing and a smaller leading wing and a plurality of tractor propellers disposed intermediate said wings, said propellers having their axes in the same general plane as said leading wing, and being disposed closer to the trailing edge of said leading wing than to the leading edge of said main wing so as to induce a slipstream effect of airflow past said leading wing to increase the lift thereof.

3. An aircraft comprising a main wing and a smaller leading wing and a plurality of tractor propellers disposed intermediate said wings, said propellers having their axes in the same general plane as said leading wing and being disposed sufficiently close to the trailing edge of said leading wing as to induce a slipstream effect of airflow past said leading wing to increase the lift thereof, said main wing being in the same general plane as said leading wing and said propeller axes, said propellers being so spaced between said wings as to induce substantially equal changes in lift per unit area due to slipstream effect on both wings so as to maintain said aircraft in balance about the center of gravity for power-off and power-on conditions.

4. An aircraft comprising a main wing and a smaller leading wing and a plurality of tractor propellers disposed intermediate said wings, said propellers having their axes in the same plane as said leading wing and being disposed sufficiently close to the trailing edge of said leading wing as to induce a slipstream effect of airflow past said leading wing to increase the lift thereof, said main wing being in the same general plane as said leading wing and said propeller axes, including flaps on the trailing edges of said wings, wherein the area of the flaps on the main wing are at least equal to the area of the flaps on the leading wing, and means for simultaneously operating said flaps, said propellers being so spaced between said wings as to induce substantially equal changes in lift per unit area due to slipstream effect on both wings so as to maintain said aircraft in balance about the center of gravity for power-off and power-on conditions.

5. An aircraft comprising a main wing and a smaller leading wing in substantially the same plane, said wings being attached to a fuselage, a plurality of motors equally disposed on both sides of said fuselage and carried by said main wing, propellers for said motors, said propellers having their axes substantially in the plane of said wings, said propellers being disposed close to the trailing edge of said leading wing so as to induce a slipstream effect of airflow past said leading wing, wherein the center of gravity of said aircraft is disposed at some point intermediate said wings, said propellers being so spaced between said wings as to induce substantially equal changes in lift per unit area due to slipstream effect on both wings so as to maintain said aircraft in balance about the center of gravity for power-off and power-on conditions.

6. An aircraft comprising a main wing and a smaller leading wing and a plurality of tractor propellers disposed intermediate said wing, said propellers having their axes in the same plane as said leading wing and being disposed sufficiently close to the trailing edge of said leading wing as to induce a slipstream effect of airflow past said leading wing to increase the lift thereof, wherein the center of gravity of said aircraft is disposed at some point intermediate said wings, said propellers being so spaced between said wings as to induce substantially equal changes in lift per unit area due to slipstream effect on both wings so as to maintain said aircraft in balance about the center of gravity for power-off and power-on conditions.

7. An aircraft comprising a main wing and a smaller leading wing and a plurality of tractor propellers disposed intermediate said wings, said propellers having their axes in the same general plane as said leading wing, and being disposed closer to the trailing edge of said leading wing than to the leading edge of said main wing so as to induce a slipstream effect of airflow past said leading wing to increase the lift thereof, wherein the center of gravity of said aircraft is disposed at some point intermediate said wings, said propellers being so spaced between said wings as to induce substantially equal changes in lift per unit area due to slipstream effect on both wings so as to maintain said aircraft in balance about the center of gravity for power-off and power-on conditions.

8. An aircraft comprising a main wing and a smaller leading wing and a plurality of tractor propellers disposed intermediate said wings, said propellers having their axes in the same plane as said leading wing and being disposed sufficiently close to the trailing edge of said leading wing as to induce a slipstream effect of airflow past said leading wing to increase the lift thereof, said main wing being in the same general plane as said leading wing and said propeller axes, wherein the center of gravity of said aircraft is disposed at some point intermediate said wings, said propellers being so spaced between said wings as to induce substantially equal changes in lift per unit area due to slipstream effect on both wings so as to maintain said aircraft in balance about the center of gravity for power-off and power-on conditions.

9. An aircraft comprising a main wing and a smaller leading wing in the same general plane, and a plurality of tractor propellers disposed intermediate said wings, said propellers having their axes in the same plane as said wings and being disposed sufficiently close to the trailing edge of said leading wing as to induce a slipstream effect of airflow past said leading wing to increase the lift thereof, including flaps on the trailing edges of said wings, wherein the area of the flaps on the main wing are at least equal to the area of the flaps on the leading wing, and means for simultaneously operating said flaps, wherein the center of gravity of said aircraft is disposed at some point intermediate said wings, said propellers being so spaced between said wings as to induce substantially equal changes in lift per unit area due to slipstream effect on both wings so as to maintain said aircraft in balance about the center of gravity for power-off and power-on conditions.

10. An aircraft comprising a fuselage, a main wing and a smaller leading wing, said wings being substantially co-planar and attached to said fuselage, a plurality of motors equally disposed on both sides of said fuselage and carried by said main wing, propellers driven by said motors, said propellers having their axes substantially in the plane of said wings, said propellers being disposed close to the trailing edge of said leading wing so as to induce a slipstream effect of airflow past said leading wing, said aircraft having its center of gravity disposed at some point intermediate said wings, and a flap on each wing on each side of the fuselage including means for simultaneously actuating said flaps, said propellers being so spaced between said wings as to induce substantially equal changes in lift per unit area due to slipstream effect on both wings so as to maintain said aircraft in balance about the center of gravity for power-off and power-on conditions.

11. An aircraft comprising a main wing and a smaller leading wing and a plurality of tractor propellers disposed intermediate said wings, said propellers having their axes in the same plane as said leading wing and being disposed sufficiently close to the trailing edge of said leading wing as to induce a slipstream effect of airflow past said leading wing to increase the lift thereof, said main wing being in the same general plane as said leading wing and said propeller axes, flaps on the trailing edges of said wings, wherein the spanwise lengths of said flaps are substantially equal in the slipstream area, said propellers being so spaced between said wings as to induce substantially equal changes in lift per unit area due to slipstream effect on both wings so as to maintain said aircraft in balance about the center of gravity for power-off and power-on conditions.

THOMAS COCHRANE CAMPBELL.
ERIC VINCENT HALL.

REFERENCES CITED

The following references are of record in the file of this patent:

UNITED STATES PATENTS

| Number | Name | Date |
|---|---|---|
| 1,869,871 | Stout | Aug. 2, 1932 |
| 2,003,206 | Lewis | May 28, 1935 |
| 2,112,755 | Back | Mar. 29, 1938 |
| 2,156,994 | Lachmann | May 2, 1939 |
| 2,271,226 | Johnson | Jan. 27, 1942 |
| 2,406,625 | Oglesby | Aug. 27, 1946 |
| 2,421,694 | Hawkins | June 3, 1947 |

FOREIGN PATENTS

| Number | Country | Date |
|---|---|---|
| 474,955 | Germany | June 13, 1926 |
| 789,619 | France | May 6, 1935 |
| 803,976 | France | July 20, 1936 |